United States Patent [19]

Coney

[11] 4,335,220

[45] Jun. 15, 1982

[54] SEQUESTERING AGENTS AND COMPOSITIONS PRODUCED THEREFROM

[75] Inventor: Charles H. Coney, Kingsport, Tenn.

[73] Assignee: Eastman Kodak Company, Rochester, N.Y.

[21] Appl. No.: 251,646

[22] Filed: Apr. 6, 1981

[51] Int. Cl.$^3$ .......................... C08J 3/02; C08L 35/02
[52] U.S. Cl. .................................. 523/414; 523/426; 523/447; 523/455; 523/463; 523/465
[58] Field of Search ........... 260/22 A, 22 EP, 29.2 N, 260/29.2 EP, 29.2 E

[56] References Cited

U.S. PATENT DOCUMENTS

| | | | |
|---|---|---|---|
| 3,442,842 | 5/1969 | Bonin | 528/302 |
| 3,734,874 | 5/1973 | Kibler et al. | 260/29.2 N |
| 3,772,252 | 11/1973 | Blunt | 260/29.2 E |
| 3,779,993 | 12/1973 | Kibler et al. | 260/29.2 N |
| 3,849,377 | 11/1974 | Boehmke | 260/29.2 E |
| 4,233,196 | 11/1980 | Sublett | 260/29.2 N |

*Primary Examiner*—Ronald W. Griffin
*Attorney, Agent, or Firm*—John F. Stevens; Daniel B. Reece, III

[57] ABSTRACT

Disclosed are compositions comprising an aqueous dispersion of a finely divided organic substance and a sequestering agent. The sequestering agent is a linear, water-dissipatable polymer having an inherent viscosity of at least about 0.1 and comprising the reaction products of the following components or ester forming or esteramide forming derivatives thereof;

(a) at least one dicarboxylic acid;
(b) at least one difunctional sulfomonomer containing at least one metal sulfonate group attached to an aromatic nucleus wherein the functional groups are hydroxy, carboxyl or amino; and
(c) a glycol or a mixture of a glycol and diamine having two —NRH groups, the glycol containing two —CH$_2$—OH groups of which from at least 0.1 mole percent based on the total mole percent of hydroxy or hydroxy and amino equivalents, is a poly(ethylene glycol) having the structural formula:

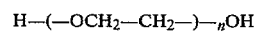

$$H\text{---}(\text{---}OCH_2\text{---}CH_2\text{---})\text{---}_n OH$$

n being an integer of between 2 and about 500, with the proviso that the mole percent of said poly(ethylene glycol) within said range is inversely proportional to the quantity of n within said range. The reaction components may also include one or more difunctional reactants selected from a hydroxycarboxylic acid having one —CR$_2$—OH, an aminocarboxylic acid having one —NRH group, an aminoalcohol having one —CR$_2$OH group and one —NRH or mixtures thereof, wherein each R is an H atom or an alkyl group of 1 to 4 carbon atoms.

23 Claims, No Drawings

SEQUESTERING AGENTS AND COMPOSITIONS PRODUCED THEREFROM

BACKGROUND OF THE INVENTION

1. Field of the Invention

This invention relates to compositions comprising sequestering agents in aqueous dispersions with organic substances. The sequestering agents are water dissipatable polyesters and polyesteramides containing ether groups and sulfonate groups in the form of a metal salt.

2. Description of the Prior Art

U.S. Pat. Nos. 3,779,993; 3,734,874 and 4,233,196, the disclosures of which are incorporated herein by reference, relate to compositions comprising an aqueous dissipation of polymers described as linear, water-dissipatable, meltable polyesters or polyesteramides, having an inherent viscosity of at least 0.1 and preferably (in some cases) at least 0.3, prepared from a glycol component, a dicarboxylic acid component, and a difunctional monomer component. The components used in the polymer condensation products are all essentially difunctional.

These patents disclose a linear, water-dissipatable polymer having carbonyloxy interconnecting groups in the linear molecular structure wherein up to 80% thereof may be carbonylamido linking groups, the polymers consisting essentially of the following components:

(a) At least one difunctional dicarboxylic acid;

(b) At least one difunctional glycol containing two —CR$_2$—OH groups of which at least 0.1 mole percent is a poly(ethylene glycol) having the structural formula:

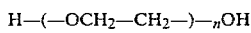

H—(—OCH$_2$—CH$_2$—)—$_n$OH n being an integer in the range between about 2 and about 500;

(c) An amount sufficient to provide said water-dissipatable characteristic of said polymer of at least one difunctional sulfo-monomer containing at least one metal sulfonate group attached to an aromatic nucleus wherein the functional groups are hydroxy, carboxyl or amino; and (d) From none to an amount of a difunctional hydroxycarboxylic acid having one —CR$_2$—OH group, an aminocarboxylic acid having one —NRH group, an aminoalcohol having one —CR$_2$—OH group and one —NRH group, a diamine having two —NRH groups, or a mixture thereof, wherein each R is an H atom or a 1-4 carbon alkyl group, said components (a), (b), (c) and (d) being organic compounds, each of which contains a hydrocarbon moiety which has from none up to six nonfunctional groups.

These patents do not suggest the use of such water-dissipatable polymers as sequestering agents, or compositions comprising these polymers dissipated in water and having water insoluble organic substances or water nondispersible organic substances dispersed therein.

DESCRIPTION OF THE INVENTION

The present invention provides aqueous compositions comprising a water-dissipatable polyester or polyesteramide having dispersed therein a finely divided organic substance. The organic substance may be either a solid or liquid at room temperature. The compositions of this invention are especially desirable in many applications because they are water-based and do not require the use of surfactants. In many cases water-based compositions are preferred over organic-based compositions, and surfactants are undesirable because they sometimes tend to change the pH of the system or react with the organic substance which is dispersed in the composition. A further advantage of this sequestering agent is that it renders the organic substance essentially free of susceptibility to softening, or redispersing in water subsequent to the initial removal of the water or drying of the film. Conversely, many surfactants render the dried composition highly susceptible and redispersible in water.

The compositions of this invention comprise a sequestering agent, i.e., the water-dissipatable polyester or polyesteramide, which holds an organic material dispersed in the aqueous medium by means of a coordination complex between the polyester or polyesteramide and the organic substance.

In accordance with the present invention, compositions comprising finely divided organic substances dispersed in aqueous solutions are provided. As a sequestering agent, there is used water dissipatable polyesters and polyesteramies having carbonyloxy interconnecting groups in the linear molecular structure wherein up to 80% thereof may be carbonylamido linking groups, the polymer having an inherent viscosity of at least about 0.1, and the polymer consisting essentially of the following components or ester forming or ester-amide forming derivatives thereof;

(a) at least one difunctional dicarboxylic acid;

(b) from about 4 to about 25 mole percent, based on a total of all acid, hydroxyl and amino equivalents being equal to 200 mole percent, of at least one difunctional sulfomonomer containing at least one metal sulfonate group attached to an aromatic nucleus wherein the functional groups are hydroxy, carboxyl or amino; and (c) at least one difunctional reactant selected from a glycol or a mixture of a glycol and diamine having two —NRH groups, the glycol containing two —CH$_2$—OH groups of which at least 0.1 mole percent based on the total mole percent of hydroxy or hydroxy and amino equivalents, is a poly(ethylene glycol) having the structural formula:

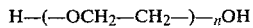

H—(—OCH$_2$—CH$_2$—)—$_n$OH n being an integer of between 2 and about 500, with the proviso that the mole percent of said poly(ethylene glycol) within said range is inversely proportional to the quantity of n within said range. Solubility is related to the weight percent of poly(ethylene glycol) and mole percent of sulfomonomer. Therefore, if the content of either is relatively low, the other should be relatively high to maintain adequate solubility.

The polymer may contain at least one difunctional reactant selected from a hydroxycarboxylic acid having one —CR$_2$—OH, an aminocarboxylic acid having one —NRH group, an aminoalcohol having one —CR$_2$—OH group and one —NRH or mixtures thereof, wherein each R is an H atom or an alkyl group of 1 to 4 carbon atoms.

The values of n and the mole percent of poly(ethylene glycol) are adjusted such that the mole percent of poly(ethylene glycol) within the stated range is inversely proportional to the quantity of n within the stated ranges. Thus, when the mole percent is high, the value of n is low. On the other hand, if the mole percent is low, the value of n is high. It is apparent, therefore, that the weight percent (product of mole percent and molecular weight) of the poly(ethylene glycol) is an important consideration because the water dissipatability of the copolyester decreases as the weight percent poly(ethylene glycol) in the copolyester decreases. For example, if the weight percent of poly(ethylene glycol) is too low, the water dissipatability of the copolyester may be inadequate. Furthermore, the weight percent of poly-(ethylene glycol) is preferably adjusted such that it is inversely proportional to the mol percent of the difunctional sulfomonomer because the water dissipatability of the copolyester is a function of both the mole percent sulfomonomer and the weight percent polyethylene glycol.

Useful polyesters include those wherein the sulfomonomer is a dicarboxylic acid and constitutes about 8 to about 50 mole percent, preferably about 10 to about 50 mole percent based on the sum of (1) the moles of the total dicarboxylic acid content of components (a) and (b), and (2) one-half of the moles of any hydroxycarboxylic acid.

Other useful polyesters include those wherein the sulfomonomer is a glycol and constitutes about 8 mole percent to about 50 mole percent based on the sum of the total glycol content measured in moles of (b) and (c), and one-half of the moles of any hydroxycarboxylic acid.

Examples of suitable poly(ethylene glycols) include relatively high molecular weight polyethylene glycols, some of which are available commercially under the designation "Carbowax", a product of Union Carbide. Diethylene glycol is especially suitable.

Other useful glycols may consist of aliphatic, alicyclic, and aralkyl glycols. Examples of these glycols include ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol. Copolymers may be prepared from two or more of the above glycols.

The dicarboxylic acid component of the polyester or polyesteramide comprises aliphatic dicarboxylic acids, alicyclic dicarboxylic acids, aromatic dicarboxylic acids, or mixtures of two or more of these acids. Examples of such dicarboxylic acids include succinic; glutaric; adipic; azelaic; sebacic; fumaric; maleic; itaconic; 1,4-cyclohexanedicarboxylic; phthalic; terephthalic and isophthalic. If terephthalic acid is used as the dicarboxylic acid component of the polyester, superior results are achieved when at least 5 mole percent of one of the other acids is also used.

It should be understood that use of the corresponding acid anhydrides, esters, and acid chlorides of these acids is included in the term "dicarboxylic acid".

Other suitable acids are disclosed in U.S. Pat. No. 3,779,993.

The difunctional sulfo-monomer component of the polyester or polyesteramide may advantageously be a dicarboxylic acid or an ester thereof containing a metal sulfonate group or a glycol containing a metal sulfonate group or a hydroxy acid containing metal sulfonate group. The metal ion of the sulfonate salt may be Na+, Li+, K+ and the like. When a monovalent alkali metal ion is used the resulting polyesters or polyesteramides are less readily dissipated by cold water and more readily dissipated by hot water. When a divalent or a trivalent metal ion is used the resulting polyesters or polyesteramides are not ordinarily easily dissipated by cold water but are more readily dissipated in hot water. It is possible to prepare the polyester or polyesteramide using, for example, a sodium sulfonate salt and later by ion-exchange replace this ion with a different ion, and thus alter the characteristics of the polymer. The difunctional monomer component may also be referred to as a difunctional sulfomonomer and is further described hereinbelow.

Advantageous difunctional components which are aminoalcohols include aromatic, aliphatic, heterocyclic and other types as in regard to component (d). Specific examples include 5-aminopentanol-1,4-aminomethylcyclohexanemethanol, 5-amino-2-ethyl-pentanol-1,2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one—NRH group and one —CR$_2$—OH group.

Advantageous difunctional monomer components which are aminocarboxylic acids include aromatic, aliphatic, heterocyclic, and other types as in regard to component (d) and include lactams. Specific examples include 6-aminocaproic acid, its lactam known as caprolactam, omegaaminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Advantageous examples of difunctional monomer component (d) which are diamines include ethylenediamine; hexamethylenediamine; 2,2,4-trimethylhexamethylenediamine; 4-oxaheptane-1,7-diamine, 4,7-dioxadecane-1,10-diamine; 1,4-cyclohexanebismethylamine; 1,3-cyclohexanebismethylamine; heptamethylenediamine; dodecamethylenediamine, etc.

Advantageous difunctional sulfo-monomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7-dicarboxylic acid, and their esters; metallosulfoaryl sulfonate as described in U.S. Pat. No. 3,779,993.

Other advantageous sulfo-monomer components include alkali metal salts of a sulfodiphenyl ether dicarboxylic acid or its ester as described in Defensive Publication 868 O.G. 730 published Nov. 18, 1969.

Particularly superior results are achieved when the difunctional sulfo-monomer component is 5-sodiosulfoisophthalic acid or its esters.

When the sulfonate-containing difunctional monomer is an acid or its ester, the polyester or polyesteramide should contain at least 8 mole percent of said monomer based on total acid content, with more than 10 mole percent giving particularly advantageous results. Total acid content is calculated as the sum of (1) moles of component (a) namely dicarboxylic acids, (2) one-half of the moles of carboxyl-containing compounds of component (d), (3) moles of component (c) which are dicarboxylic acids, and (4) one-half of the moles of component (c) which are monocarboxy-containing compounds.

When the sulfomonomer is a glycol containing a metal sulfonate group, the polyester or polyesteramide should contain at least 8 mole percent of the sulfomonomer based on total hydroxy content and any amino content from a monomer component, with more than 10 mole percent giving particularly advantageous results. Total hydroxy and amino content from monomer components obviously excludes the oxy atoms internally present in the poly(ethylene glycol) and is calculated as the sum of (1) moles of component (b), (2) one-half of the moles of any carboxylcontaining compounds of component (d), (3) any moles of component (d) which are amino-alcohols and diamines, (4) one-half of the moles of component (c) which are mono-hydroxy or mono-amino containing compounds, and (5) moles of component (c) which are dihydroxy, diamino and aminohydroxy compounds.

Greater dissipatability is achieved when the difunctional sulfomonomer constitutes from about 5 mole percent to about 25 mole percent out of a total of 200 mole percent of (a), (b), (c) and any (d) components of the polyester or polyesteramide. The total of 200 mole percent is explained below and can also be referred to as 200 mole parts. Varying the mole percentages of sulfonate-containing difunctional monomer varies the water susceptibility of the polymer. In addition, the mixture of dissipated polymer and aqueous solution is unexpectedly stable, thus demonstrating the hydrolytic stability of the polymer.

To obtain the polymers used in this invention, the sulfonate-containing difunctional monomer modifier may be added directly to the reaction mixture from which the polymer is made. Thus, these monomer modifiers can be used as a component in the original polymer reaction mixture. Other various processes which may be employed in preparing the novel polymers of this invention are well known in the art and are illustrated in such patents as U.S. Pat. Nos. 2,465,319; 3,018,272; 2,901,466; 3,075,952; 3,033,822; 3,033,826 and 3,033,827. These patents illustrate interchange reactions as well as polymerization or build-up processes.

Whenever the term "inherent viscosity" (I.V.) is used in this description, it will be understood to refer to viscosity determinations made at 25° C. using 0.25 gram of polymer per 100 ml. of a solvent composed of 60 percent phenol and 40 percent tetrachloroethane as parts by weight.

The preferred water-dissipatable polyesters include those having an I.V. of at least 0.3, and prepared from an acid component comprising isophthalic or mixtures of isophthalic and terephthalic acid, and 5-sodiosulfoisophthalic acid or esters thereof. The preferred glycols are 1,4-cyclohexanedimethanol and diethylene glycol. Especially preferred are polyesters prepared from about 70-95 mole % isophthalic acid, about 30-5 mole % 5-sodiosulfoisophthalic acid, 40-100 mole % diethylene glycol and 60-0 mole % 1,4-cyclohexanedimethanol.

The polyesters or polyesteramides may be prepared by conventional teechniques well known in the art, for example, the methods disclosed in U.S. Pat. No. 3,734,874, which is incorporated herein by reference. Example 1, however, is submitted as a typical method.

The materials that can be sequestered in accordance with this invention are water insoluble, hydrophobic, deformable organic substances. By the term "deformable organic substance", it is meant that the substance is either a liquid or semi-solid mass which is flowable under moderate shear at the temperature it is mixed with the polyester dissipation. An example of a semi-solid mass would be a thixatrophic substance. The deformable organic substance must, therefore, be a liquid or semi-solid mass at temperatures below 100° C. and atmospheric pressure. These organic substances should have a low degree of polarity, i.e., a dipole moment of from 0 to about 1.8 such that they are non-miscible with water. Also, the organic substances should be nonreactive with water and the water soluble polyester described herein, and preferably have a low multivalent ion content. Organic substances which may be sequestered in accordance with this invention include sucrose esters, aromatic organic compounds, aliphatic or alicyclic organic compounds, paraffins, vegetable oils, etc. Specific examples of such organic compounds include sucrose acetate isobutyrate, toluene, hexane, cyclohexane, paraffin (melting point of 140° F.), corn oil, 2,2,4-trimethylpentane-1,3-diol, 2-ethylhexanol, gasoline, motor oil, raw linseed oil, mineral oil, citronella oil, etc., all of which have dipole moments of between 0 and 1.8. All of the organic substances specifically mentioned are found to easily disperse in the polyester dissipations upon stirring in a Waring Blendor.

The compositions of this invention are prepared by mixing the organic material, in liquified or semi-solid form, in an aqueous dissipation of the polyester. The dissipation may contain about 44% to about 90% by weight water, (preferably about 50 to 70%), and about 0.1 to about 30% by weight polyester, (preferably about 10 to about 23%). The compositions of this invention may contain about 0.1% to about 65% by weight, preferably about 0.1% to about 30% by weight of the organic material.

The organic substance may be mixed into the polyester-water dissipation by conventional means, such as by tumbling, high shear mixers (e.g., Waring Blendor), etc. If the organic substance is a liquid, then of course the solution should be held at a temperature and/or pressure to maintain it in the liquid or semi-solid state. If the organic substance melts or becomes semi-solid in excess of 100° C., then the higher melting temperature will require suitably higher pressure to be used to maintain both the aqueous dissipation and organic substance in liquid or semi-solid form until mixing is complete.

The compositions of this invention are very useful because an aqueous based system is often preferred to an organic system. Since the polyester solution is of a neutral pH, it is useful in dispersing cosmetics, food flavoring, coating compositions and the like.

The following examples are submitted for a better understanding of this invention.

EXAMPLE 1

A 500-ml round-bottom flask equipped with a ground-glass bead, an agitator shaft, nitrogen inlet, and a sidearm is charged with 54.87 g (0.2828 moles) of dimethyl isophthalate, 0.34109 mole of 1,4-cyclohexanedimethanol, 15 g of Carbowax ® 1540 (average molecular weight of 1500), 7.02 g (0.02373 moles) of dimethyl-5-sodiosulfoisophthalate, 0.22 g of sodium acetate, and 0.0662 grams of titanium isopropyl titinate (16% titanium). The flask is immersed in a Belmont metal bath at 200° C. for two hours with stirring under a nitrogen sweep. The temperature of the bath is then increased to 280° C. and the flask heated for 1 hour and 15 minutes under a reduced pressure of 0.5 to 0.1 mm of Hg. The flask is allowed to cool at room temperature and the copolyester is removed from the flask. The copolyester contains 3.26 mole % of Carbowax 1540. The inherent viscosity of the copolyester is 0.45.

EXAMPLE 2

Dispersions of sucrose acetate isobutyrate (SAIB) are prepared in water by heating an aqueous dissipation of the polyester described above as being especially preferred to 180° F., heating the SAIB to 180° F. and combining by slowly adding the SAIB to the polyester dissipation. The dissipation contains about 70% water by weight and about 30% polyester by weight. The polyester dissipation is rapidly stirred in a Waring Blendor as the SAIB is added. The polyester dissipation accounts for 100 parts by weight of the composition and the SAIB accounts for 20 parts by weight of the composition. When cooled to room temperature, a uniform dispersion of SAIB in the polyester dissipation is obtained. The dispersion tends to settle on standing but redisperses upon shaking.

EXAMPLE 3

A dispersion of toluene and SAIB in the especially preferred polyester dissipation is prepared in a manner similar to that described for Example 2, except that 5 parts by weight of toluene are added to 20 parts by weight SAIB prior to adding to 100 parts by weight of the polyester dissipation. The dispersion appears to be stable even after standing.

Both the dispersions of Example 2 and Example 3 perform well as a paper adhesive and give initial tack to the paper as another paper is pressed on it.

EXAMPLE 4

Sixty grams of the polyester described herein as the most preferred are dissipated in 140 grams water and heated to 80° C. Sixty grams of paraffin wax (melting point of 140° F.) are heated to 115° C. The dissipation is placed in a Waring Blendor and high shear agitation is begun. The paraffin wax is slowly added, after which the high shear agitation is continued for 5 minutes. The composition is removed and allowed to cool to room temperature. The sequestered paraffin tends to rise to the top upon standing, and reaches a stable state. Upon slight agitation, it forms a completely homogeneous dispersion.

Although the compositions according to this invention are sometimes described herein as dispersions, it should be understood that the finely divided organic substance, which may be either a solid or liquid at room temperature, is actually sequestered by the action of the polymer dissipation.

Polarity as described herein is measured in dipole moments in accordance with known methods, for example, in "Dipole Moments in Organic Chemistry" by V. I. Minkin, O. A. Osipov, and Yu. A. Zhdanov, published by Plenum Press, New York - London, 1970. Actual values of the dipole moments of many compounds are given in "Tables of Experimental Dipole Moments", by A. L. McClellan, published by W. H. Freeman and Company, 1963.

Unless otherwise specified, all parts, percentages, ratio, etc., are by weight.

The invention has been described in detail with particular reference to preferred embodiments thereof, but it will be understood that variations and modifications can be effected within the spirit and scope of the invention.

I claim:
1. Composition comprising an aqueous dissipation of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane 25° C. and at a concentration of about 0.25 gram of polymer in 100 ml. of the solvent, the polymer containing substantially equimolar proportions of acid equivalents (100 mole percent), the polymer comprising the reaction products of (a), (b), (c) and (d) from the following components or ester forming or esteramide forming derivatives thereof;
 (a) at least one difunctional dicarboxylic acid;
 (b) from about 4 to about 25 mole percent, based on a total of all acid, hydroxyl and amino equivalents being equal to 200 mole percent, of at least one difunctional sulfo-monomer containing at least one metal sulfonate group attached to an aromatic nucleus wherein the functional groups are hydroxy, carboxyl or amino;
 (c) at least one difunctional reactants selected from a glycol or a mixture of a glycol and diamine having two —NRH groups, the glycol containing two —CH$_2$—OR groups of which at least 0.1 mole percent based on the total mole percent of hydroxy or hydroxy and amino equivalents, is a poly(ethylene glycol) having the structural formula:

$$H—(—OCH_2CH_2—)—_nOH$$

n being an integer of between 2 and about 500; and
 (d) from none to at least one difunctional reactant selected from a hydroxy-carboxylic acid having one —CR$_2$—OH, an aminocarboxylic acid having one —NRH group, an amino-alcohol having one $$—CR_2OH$$

group and one —NRH or mixtures thereof, wherein each R is an H atom or an alkyl group of 1 to 4 carbon atoms,
said composition further comprising a water insoluble, hydrophobic deformable organic substance sequestered therein which is not reactive with said polyester or polyesteramide, said organic substance being nonmiscible with water.

2. Composition according to claim 1 wherein said organic substance is selected from the group consisting of sucrose esters, aromatic organic compounds, aliphatic or alicyclic organic compounds, paraffins and vegetable oils.

3. Composition according to claim 1 wherein said organic substance is selected from the group consisting of sucrose acetate isobutyrate, toluene, hexane, cyclohexane, paraffin, corn oil, 2,2,4-trimethylpentane-1,3-diol, 2-ethylhexanol, gasoline, linseed oil, mineral oil and citronella oil.

4. Composition according to claim 1 wherein said deformable organic substance is a liquid at the temperature and pressure of sequestration.

5. Composition according to claim 1 wherein said deformable organic substance is a semi-solid at the temperature and pressure of sequestration.

6. Composition according to claim 1 wherein said deformable organic substance has a dipole moment of from 0 to about 1.8.

7. Composition according to claim 1 having by weight from about 44 to about 90% water, from about 0.1 to about 30% of said polymer and from about 0.1 to about 65% of said deformable organic substance.

8. Composition comprising an aqueous dissipation of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane 25° C. and at a concentration of about 0.25 gram of polymer in 100 ml. of the solvent, the polymer containing substantially equimolar proportions of acid equivalents (100 mole percent), the polymer comprising the reaction products of (a), (b), (c) and (d) from the following components or ester forming or esteramide forming derivatives thereof;
  (a) at least one difunctional dicarboxylic acid;
  (b) from about 4 to about 25 mole percent, based on a total of all acid, hydroxyl and amino equivalents being equal to 200 mole percent, of at least one difunctional sulfo-monomer containing at least one metal sulfonate group attached to an aromatic nucleus wherein the functional groups are hydroxy, carboxyl or amino;
  (c) at least one difunctional reactants selected from a glycol or a mixture of a glycol and diamine having two —NRH groups, the glycol containing two —CH$_2$—OR groups of which at least 15 mole percent based on the total mole percent of hydroxy or hydroxy and amino equivalents, is a poly(ethylene glycol) having the structural formula:

H—(—OCH$_2$CH$_2$—)—$_n$OH n being an integer of between 2 and about 500; and
  (d) from none to at least one difunctional reactant selected from a hydroxy-carboxylic acid having one —CR$_2$—OH, an aminocarboxylic acid having one —NRH group, an amino-alcohol having one

—CR$_2$OH group and one —NRH or mixtures thereof, wherein each R is an H atom or an alkyl group of 1 to 4 carbon atoms.
said composition further comprising a water insoluble, hydrophobic deformable organic substance sequestered therein which is not reactive with said polyester or polyesteramide, said organic substance being nonmiscible with water.

9. Composition according to claim 8 wherein said organic substance is selected from the group consisting of sucrose esters, aromatic organic compounds, aliphatic or alicyclic organic compounds, paraffins and vegetable oils.

10. Composition according to claim 8 wherein said organic substance is selected from the group consisting of sucrose acetate isobutyrate, toluene, hexane, cyclohexane, paraffin, corn oil, 2,2,4-trimethylpentane-1,3-diol, 2-ethylhexanol, gasoline, linseed oil, mineral oil and citronella oil.

11. Composition according to claim 8 wherein said deformable organic substance is a liquid at the temperature and pressure of sequestration.

12. Composition according to claim 8 wherein said deformable organic substance is a semi-solid at the temperature and pressure of sequestration.

13. Composition according to claim 8 wherein said deformable organic substance has a dipole moment of from 0 to about 1.8.

14. Composition comprising an aqueous dissipation of a linear, water-dissipatable polymer having carbonyloxy linking groups in the linear molecular structure wherein up to 80% of the linking groups may be carbonylamido linking groups, the polymer having an inherent viscosity of at least about 0.1 measured in a 60/40 parts by weight solution of phenol/tetrachloroethane 25° C. and at a concentration of about 0.25 gram of polymer in 100 ml. of the solvent, the polymer containing substantially equimolar proportions of acid equivalents (100 mole percent), the polymer comprising the reaction products of (a), (b), (c) and (d) from the following components or ester forming or esteramide forming derivatives thereof;
  (a) at least one difunctional dicarboxylic acid;
  (b) from about 4 to about 25 mole percent, based on a total of all acid, hydroxyl and amino equivalents being equal to 200 mole percent, of at least one difunctional sulfo-monomer containing at least one metal sulfonate group attached to an aromatic nucleus wherein the functional groups are hydroxy, carboxyl or amino;
  (c) at least one difunctional reactants selected from a glycol or a mixture of a glycol and diamine having two —NRH groups, the glycol containing two —CH$_2$—OR groups of which 0.1 to about 15 mole percent based on the total mole percent of hydroxy or hydroxy and amino equivalents, is a poly(ethylene glycol) having the structural formula:

H—(—OCH$_2$CH$_2$—)—$_n$OH n being an integer of between 2 and about 500; and with the proviso that the mole % of said poly(ethylene glycol) within said range is inversely proportional to the quantity of n within said range.
  (d) from none to at least one difunctional reactant selected from a hydroxy-carboxylic acid having one —CR$_2$—OH, an aminocarboxylic acid having one —NRH group, an amino-alcohol having one

—CR$_2$OH group and one —NRH or mixtures thereof, wherein each R is an H atom or an alkyl group of 1 to 4 carbon atoms,
said composition further comprising a water insoluble, hydrophobic deformable organic substance sequestered therein which is not reactive with said polyester or polyesteramide, said organic substance being nonmiscible with water.

15. Composition according to claim 14 wherein said organic substance is selected from the group consisting of sucrose esters, aromatic organic compounds, aliphatic or alicyclic organic compounds, paraffins and vegetable oils.

16. Composition according to claim 14 wherein said organic substance is selected from the group consisting of sucrose acetate isobutyrate, toluene, hexane, cyclohexane, paraffin, corn oil, 2,2,4-trimethylpentane-1,3-diol, 2-ethylhexanol, gasoline, linseed oil, mineral oil and citronella oil.

17. Composition according to claim 14 wherein said deformable organic substance is a liquid at the temperature and pressure of sequestration.

18. Composition according to claim 14 wherein said deformable organic substance is a semi-solid at the temperature and pressure of sequestration.

19. Composition according to claim 14 wherein said deformable organic substance has a dipole moment of from 0 to about 1.8.

20. The method of sequestering a deformable organic substance in water, said substance being insoluble and nonmiscible in water, which comprises mixing with shearing agitation a liquid or semi-solid organic substance with an aqueous solution of a polyester or polyesteramide having an inherent viscosity of at least 0.1 and having the following component:
  (a) at least one difunctional dicarboxylic acid;
  (b) from about 4 to about 25 mole percent, based on a total of all acid, hydroxyl and amino equivalents being equal to 200 mole percent, of at least one difunctional sulfo-monomer containing at least one metal sulfonate group attached to an aromatic nucleus wherein the functional groups are hydroxy, carboxyl or amino;
  (c) at least one difunctional reactants selected from a glycol or a mixture of a glycol and diamine having two —NRH groups, the glycol containing two —CH$_2$—OR groups of which at least 0.1 mole percent based on the total mole percent of hydroxy or hydroxy and amino equivalents, is a poly(ethylene glycol) having the structural formula:

$$H-(-OCH_2CH_2-)_n OH$$

n being an integer of between 2 and about 500; and
  (d) from none to at least one difunctional reactant selected from a hydroxy-carboxylic acid having one —CR$_2$—OH, an aminocarboxylic acid having one —NRH group, an amino-alcohol having one

—CR$_2$OH group and one —NRH or mixtures thereof, wherein each R is an H atom or an alkyl group of 1 to 4 carbon atoms.

21. Method according to claim 20 wherein the water is present in an amount of from about 44 to about 90% by weight, the polymer is present in an amount of from about 0.1 to about 30% by weight, and the deformable organic substance is present in an amount of about 0.1 to about 65%, said percentages being based on the weight of the total composition.

22. Method according to claim 20 wherein said polyester is derived from isophthalic acid, 5-sodiosulfoisophthalic acid, diethylene glycol and 1,4-cyclohexanedimethanol and said deformable organic substance is selected from the group consisting of sucrose acetate isobutyrate, toluene, hexane, cyclohexane, paraffin, corn oil, 2,2,4-trimethylpentane-1,3-diol, 2-ethylhexanol, gasoline, linseed oil, mineral oil and citronella oil.

23. Method according to claim 20 wherein said polyester is derived from isophthalic acid, 5-sodioslfoisophthlic acid, diethylene glycol and 1,4-cyclohexanedimethanol and said deformable organic substance is selected from the group consisting of sucrose esters, aromatic organic compounds, aliphatic or alicyclic organic compounds, paraffins and vegetable oils.

* * * * *